(12) United States Patent
Kirkham (10) Patent No.: US 7,136,235 B2
(45) Date of Patent: Nov. 14, 2006

(54) OPTICAL APPARATUS

(75) Inventor: Anthony John Kirkham, Denbig Shire (GB)

(73) Assignee: Thales Optics Ltd., St. Asaph (GB)

( * ) Notice: Subject to any disclaimer, the term of this patent is extended or adjusted under 35 U.S.C. 154(b) by 62 days.

(21) Appl. No.: 10/495,626

(22) PCT Filed: Nov. 11, 2002

(86) PCT No.: PCT/IB02/04713

§ 371 (c)(1),
(2), (4) Date: May 14, 2004

(87) PCT Pub. No.: WO03/042745

PCT Pub. Date: May 22, 2003

(65) Prior Publication Data

US 2006/0176580 A1    Aug. 10, 2006

(30) Foreign Application Priority Data

Nov. 16, 2001    (GB) ................................ 0127536.1

(51) Int. Cl.
*G02B 9/00* (2006.01)
(52) U.S. Cl. ....................................... 359/738; 359/754
(58) Field of Classification Search ........ 359/738–740, 359/356–357
See application file for complete search history.

(56) References Cited

U.S. PATENT DOCUMENTS

| | | | |
|---|---|---|---|
| 4,266,848 A | | 5/1981 | Schilegel |
| 4,934,771 A | * | 6/1990 | Rogers ........................ 359/356 |
| 5,373,151 A | * | 12/1994 | Eckel et al. ............. 250/208.1 |
| 5,726,670 A | | 3/1998 | Iba et al. |
| 5,980,453 A | | 11/1999 | Volk et al. |
| 6,018,414 A | * | 1/2000 | Chipper ....................... 359/356 |
| 6,057,960 A | | 5/2000 | Ulrich |
| 2003/0011894 A1 | * | 1/2003 | Schuster ...................... 359/731 |

* cited by examiner

*Primary Examiner*—Jordan M. Schwartz
(74) *Attorney, Agent, or Firm*—Lowe Hauptman & Berner LLP (57) ABSTRACT

The present invention provides an optical apparatus including an objective lens system for focusing optical radiation from a scene or object into an intermediate image and has at least one lens element which imposes a substantial degree of negative distortion on the intermediate image. The invention also provides a second lens system for focusing optical radiation from the intermediate image into a final image and an aperture stop for limiting the optical radiation forming the final image. The aperture stop is located between the final image region in which the final image is formed or to be formed and the lens element of the second lens system most distant from the final image region.

24 Claims, 3 Drawing Sheets

OPTICAL APPARATUS

FIELD OF THE INVENTION

The present invention relates to optical imaging apparatus, and particularly, though not exclusively, to apparatus for imaging infra-red radiation.

DESCRIPTION OF PRIOR ART

In forming a viewable image of an object a typical optical imaging apparatus employs an objective lens to focus optical radiation from the object into an image of thereof for subsequent viewing. Where the optical radiation is weak or invisible (such as infra-red radiation) it is often necessary to employ intermediate image detecting means to detect the weak image, or to detect an image formed from invisible radiation.

Many optical imaging methods rely on the use of electronic image detectors for this purpose, as does the optical imaging apparatus disclosed in GB2190761B. In GB2190761B, an optical imaging apparatus employs an intermediate infra-red detector, in the form of an infra-red staring array, to detect an invisible infra-red image formed by an objective lens. The detected image is then produced in a visible form at a display device operatively coupled to the detector. An eyepiece lens is employed by an observer to view the visible image.

In order to improve the resolving power of the detector, GB2190761B discloses the technique of deliberately imposing negative ("barrel") distortion upon the image formed at the detector, then subsequently reversing the barrel distortion with eyepiece optics chosen to impose a reciprocal positive ("pin cushion") distortion upon the image viewed by the observer. The resolution of the central portion of the image formed at the detector is greater than would be the case were no barrel distortion imposed. The reciprocal action of the eyepiece lens substantially removes any such barrel distortion in the viewed image, so as to provide an undistorted image with enhanced central resolution.

However, in many infra-red imaging applications it is unnecessary or undesirable to require that a viewable image be formed by eyepiece optics. For example, the barrel-distorted image produced by the objective lens may be detected by suitable thermal imaging devices for producing electronic image data for subsequent analysis or processing electronically. In such cases the display device and eyepiece of GB2190761B are redundant.

Furthermore, a feature of many infra-red imaging devices is the need to cool the detector. Typically, this is done by placing the detector within a dewar cooled to approximately 77K (e.g. by liquid nitrogen, or a cooling engine). In front of the detector and within the dewar is placed a "cold shield" which shields the detector from stray thermal radiation. Preferably, the cold shield also constitutes the limiting aperture stop of the optical apparatus. The 'aperture stop' of an optical apparatus is that aperture which limits the size of the ray bundles passing through the optical apparatus. Alternatively, the aperture stop of the optical apparatus may be located externally of the dewar but as close to the (internal) cold shield as possible.

Thus, it is advantageous that the aperture stop be situated well towards the rear of the optical train of the optical apparatus if the detector is of the cooled type. The objective lenses such as disclosed in GB2190761B employ an aperture stop placed before the objective lens (i.e. in front of the optical train) and are, therefore, not suited to those electronic detector systems which have a requirement for an aperture stop to be located well towards the rear of the optical train.

Indeed, the location of the aperture stop towards the rear of the optical train typically leads to unacceptably large diameters for the front elements of simple existing optical apparatus.

The present invention is concerned with optical imaging apparatus which provide enhanced resolution at the centre of the field compared to resolution at the edge, and is particularly concerned such apparatus suitable for imaging utilising a detector coupled to an electronic signal processing module and where it is a requirement that the aperture stop of the optics be positioned to the rear of the optical train of the apparatus, such as where the detector is an infra red detector of the cooled type within a dewar.

SUMMARY OF THE INVENTION

At its most general, the present invention proposes an optical apparatus which produces, before the aperture stop, an intermediate image of a viewed object or scene, the intermediate image being formed with a deliberate negative ("barrel") distortion, then focussing (relaying) that distorted intermediate image to the detector behind the aperture stop using optics having at least some optical elements located before the aperture stop.

Thus, the objective lens elements of the present invention are arranged to form an image of the viewed object or scene in front of the aperture stop of the apparatus rather than behind it. This intermediate image is then focussed by the elements of a second optical lens system and reformed at the detector with the aperture stop being placed between the front of the second optical lens system and the detector. One picture element (pixel) at the centre of the field of view (of the relayed and distorted image) subtends in object space a smaller solid angle than one pixel at the edge of the field, thereby providing enhanced resolution at the centre. The image formed at the detector may then be processed by an electronic signal processing module coupled to the detector. The processing may involve the removal of negative distortion from the image so as to produce a processed image with little or substantially no negative distortion, but with enhanced central resolution.

In a first of its aspects, the present invention may provide an optical apparatus comprising;

an objective lens system for focusing optical radiation from a scene or object into an intermediate image and having at least one lens element which imposes a substantial degree of negative distortion on the intermediate image;

a second lens system for focussing optical radiation from the intermediate image into a final image;

an aperture stop for limiting the optical radiation forming the final image, the aperture stop being located between the final image region in which the final image is formed or to be formed, and the lens element of the second lens system most distant from the final image region.

An image detector (e.g. Infra-red detector) may be employed for detecting the final image, the aperture stop being located between the image detector and the lens element of the second lens system most distant from the image detector in such a case. The image detector may be located within a dewar.

It is to be understood that an image "region" (for the final image or the intermediate image) refers to the region of space across which the respective image extends when formed. Typically such a region is planar, and often referred to as an "image plane", however, the invention is intended to encompass non-planar images and image detectors employing correspondingly non-planar image detecting surfaces.

By employing the above image relaying technique, the present invention may provide that all of the optical elements of the objective lens system are placed before the aperture stop in the optical train of the apparatus, while at least some of the optical elements of the second lens system are also placed before the aperture stop. This permits greater versatility and ease of manufacture where the detector is an infra red detector of the cooled type and the aperture stop must be either within or immediately in front of a dewar. Since none of the objective optics and not all of (or none of) the elements of the second optical system need be placed within the dewar itself (behind the aperture stop), those optical elements may be manufactured as separate modules from the dewar and its contents.

The aperture stop may be located after all the optical lens elements of the second lens system, being located between the image detector and the lens element of the second lens system nearest the image detector. This arrangement may provide the advantage that the whole optical train of the apparatus of the present invention may be manufactured as a separate module(s) from the detector assembly.

As stated above, it is an aim of the invention to provide an optical apparatus which produces images with high negative distortion, and the negatively distorting lens elements of the objective are preferably located in close proximity to the intermediate image region in which the intermediate image is formed or to be formed. Lens elements situated close to an image (or intermediate image) have significant effect upon distortion but little effect upon certain other aberrations such as spherical aberration.

Thus, it is preferable that lens element(s) of the optical train of the apparatus of the present invention which are responsible for negative distortion of an image are immediately adjacent the image region, or are at least the lens elements of the train closest to the image region, in which that image is formed or to be formed (e.g. the intermediate image, or the final image). Consequently, it is preferable that the final lens element of the objective lens system imparts a substantial negative distortion on the intermediate image and, more preferably, one or more lens elements of the optical train which precede the final lens also impart a substantial negative distortion on the intermediate image.

Moreover, conventional lens elements with spherical surfaces are generally not capable of correcting, or introducing, a high level of distortion; it is preferable to use aspheric surfaces to impart negative distortion on images (intermediate and/or final). Therefore in order to provide the required high distortion level it is preferable to incorporate one or more aspheric surfaces near to an image region.

Where all of the optical elements of the second lens system are located before the aperture stop of the optical apparatus of the present invention, the optical strength of the negatively distorting lenses is typically required to be very high in order to effect the required distortion in the intermediate image. However, it has been found that in such an arrangement the performance of those lens elements of the objective lens system responsible for the substantial negative distortion of the intermediate image tends to be highly sensitive to optical manufacturing tolerances.

Consequently, in the present invention, at least one optical element of the second lens system may impose a substantial degree of negative distortion on the final image. Thus, in splitting-up and separating the image (negatively) distorting optical elements between the objective lens system and the second lens system, the power required of the negatively distorting lenses has been found to be less than is the case where all negatively distorting lenses are located in the objective lens system. This has also been found to provide an optical system which is less sensitive to manufacturing tolerances and thereby may provide improved performance.

The second lens system may comprise only one negatively distorting lens element or more than one such lens element, with all lens elements thereof located before the aperture stop. In such a case the distorting lens is preferably the first or the last lens element of the second lens system, or where there are two or more such lenses, the first and the last lens elements of the second lens system are preferably negatively distorting.

It is preferable to use aspheric surfaces in the negatively distorting lens (or lenses) of the second lens system to impart negative distortion on the final image. Therefore in order to provide the required high distortion level it is preferable to incorporate one or more aspheric surfaces near to the image region of the final image or the intermediate image. Preferably, the second lens system has at least two image (negatively) distorting lenses, one located within the optical train at a position relatively near to the image region of the intermediate image and the other located in the optical train relatively near the image region of the final image.

Preferably, the second lens system has a lens element for imparting a substantial negative distortion on the final image and being the first lens element following the image region of the intermediate image, and a lens element following the aperture stop of the optical apparatus for imparting a substantial negative distortion on the final image and being the last lens element preceding the final image region. This is preferably achieved by providing an image (negatively) distorting lens immediately following the image region of the intermediate image and placing another image (negatively) distorting lens after the aperture stop of the apparatus (e.g. within the dewar) and immediately preceding the final image region. Thus the advantages of separation of the image distorting lenses between the objective and second lens systems is provided, and the advantages of close proximity between negatively distorting lens and image are also gained since both the intermediate and final images are in close proximity to at least one lens of substantial negative distortion.

Of course, it is to be understood that other optical elements may be located between the final lens element of the second lens system and the final image region. Such other optical elements include the dewar (or detector) window, and/or a spectral filter, both of which may comprise plano/plano optical components.

Preferably, the final lens element of the objective lens system imparts a substantial negative distortion on the intermediate image. One or more lens elements of the objective lens system which precede the final lens of the objective lens system may impart a substantial negative distortion on the intermediate image.

Preferably, the detector is an infra-red detector and the aperture stop is located adjacent or within a cooled dewar and serves the function of a cold shield for the detector. Thus, in such a case, where one or more lenses of the second lens system is located after the aperture stop, those lenses are located within the cooled dewar. The dewar may be cooled by use of a coolant such as liquid Nitrogen, or by means of a cooling engine. Preferably, the detector is coupled to an image processing module operable to receive image data from the detector representing a final image detected thereby.

Preferably, the at least some of (preferably all of) the lens elements of both the objective lens system and the second lens system are chosen to be athermal for focus. That is to say, the focal plane position of each such lens is substantially constant with temperature over the typical operating ranges of temperature. One or more of the lens elements of the optical apparatus may possess a diffractive structure suitable for providing colour correction in the optics.

The optical apparatus may be sold in unassembled form and consequently, in a second of its aspects, the present invention may provide a kit of parts for an optical apparatus comprising:

an objective lens system for focusing optical radiation from a scene or object into an intermediate image and having at least one lens element which imposes a substantial degree of negative distortion on the intermediate image;

a second lens system for focussing optical radiation form the intermediate image into a final image;

an aperture stop for limiting the optical radiation forming the final image, the optical apparatus being arranged for locating the aperture stop between the final image region in which the final image is to be formed and the lens element of the second lens system most distant from the final image region in use.

The kit of parts may further comprise an image detector for detecting the final image, the optical apparatus being arranged for locating the aperture stop between the image detector and the lens element of the second lens system most distant from the image detector in use. The kit may further comprise a dewar for containing the image detector.

Thus, it will be appreciated that the optical apparatus of the present invention realises a method of optical imaging. Therefore, in a third of its aspects, the present invention may provide a method of optical imaging comprising:

focusing optical radiation from a scene or object into an intermediate image with a substantial degree of negative distortion;

focussing optical radiation from the intermediate image into a final image at a final image region with a lens system;

limiting the optical radiation forming the final image with the aperture stop located between the final image region and the lens element of the lens system most distant from the final image region.

A detector having a detection surface (planar or non-planar) may then be employed (e.g. an Infra-red detector within a dewar) according to this method, such that the optical radiation from the intermediate image is focussed into a final image at an image detection surface with said optical lens system.

The aperture stop would preferably then be located between the image detection surface and the lens element of the optical lens system most distant from the image detection surface.

According to this method, it is preferable that a substantial negative distortion is imposed on the final image while focussing the intermediate image using the lens system. Preferably, a substantial negative distortion is imparted on an image with lens elements of the lens system located immediately adjacent the image region in which the respective image is formed or to be formed.

Substantial negative distortion may preferably be imparted on the final image with a lens element located adjacent the image region of the intermediate image and another lens element located adjacent the image region of the final image. More preferably, substantial negative distortion is imparted on the intermediate image using at least the final lens element an objective lens system.

A substantial negative distortion may be imposed on the final image using a lens element immediately following the intermediate image region, and a lens element following the aperture stop and immediately preceding the final image region.

BRIEF DESCRIPTION OF THE FIGURES

Embodiments of the invention will now be described by way of specific, but non-limiting, examples with reference to the accompanying drawings in which.

DETAILED DESCRIPTION OF THE PREFERRED EMBODIMENT

Figure 1:
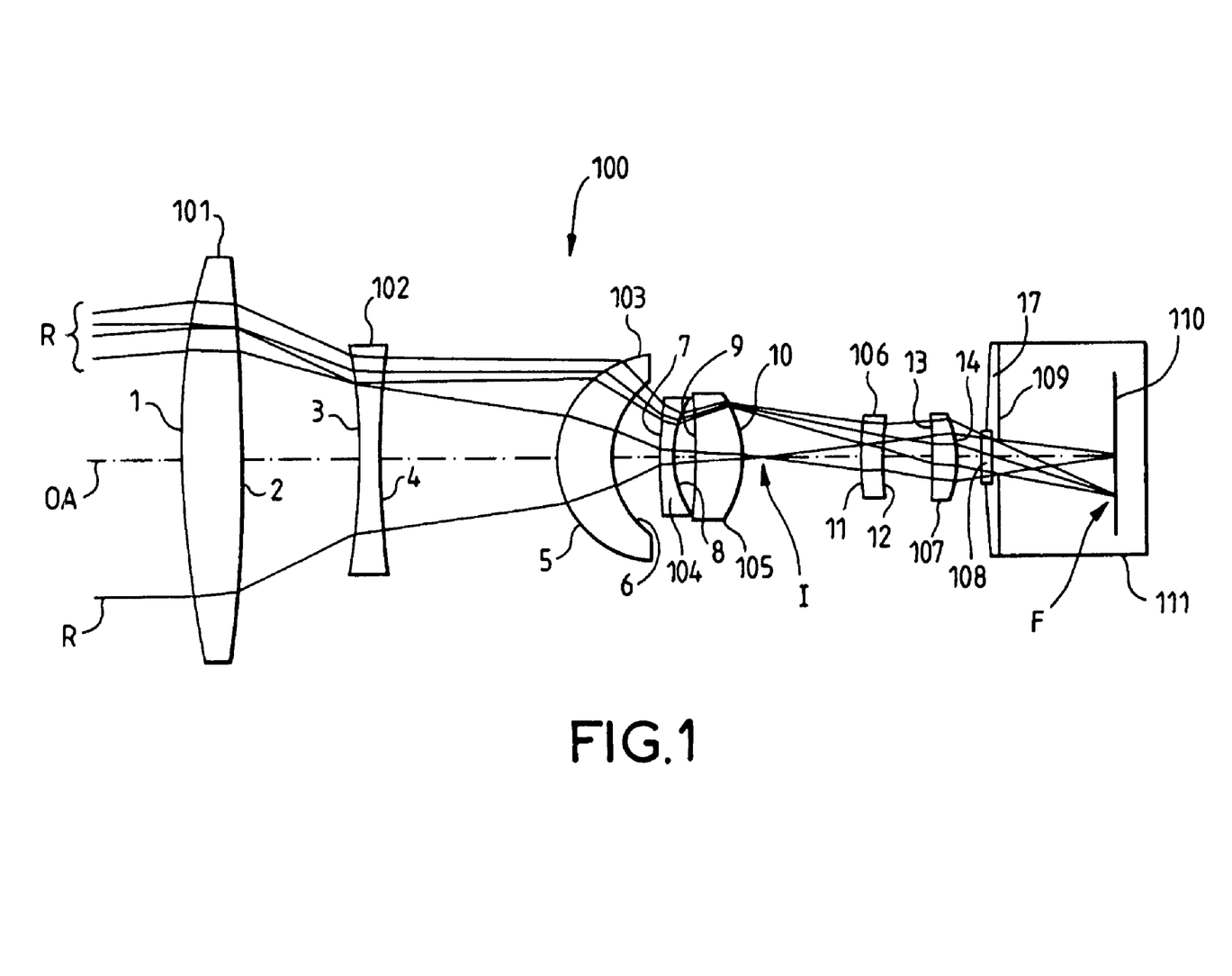
FIG. 1 illustrates an optical apparatus in which all optical lens elements are located before the aperture stop of the apparatus.

FIG. 1 illustrates a first embodiment of the present invention in which the optical apparatus, generally denoted 100, is an infra-red imaging apparatus and operates in the 4.0–5.0 µm infra-red waveband. The apparatus 100 comprises an objective lens system in the form of an optical train of lens elements arranged along a common optical axis OA, and consisting of a first (i.e. leftmost in FIG. 1) lens element 101, three successive intermediate lens elements 102, 103 and 104, and a terminal lens element 105. Following this train of objective lens elements, and on the optical axis OA, is a train of relay lens elements consisting of a first relay lens element 106, and a terminal relay lens element 107. A dewar 111 is placed on optical axis OA beyond the terminal lens element 107. The dewar has a window 108 and houses an aperture stop 109 and an electronic infra-red image detector 110. The dewar assembly is cooled by a suitable means (not shown) which cools both the detector 110 and the aperture stop 109, such that it forms a cold shield which minimises the ingress of stray thermal radiation to the cooled infra-red image detector 110.

The optical apparatus has no optical lens elements following the aperture stop (cold shield) 109.

In use, Infra-red radiation from a distant object or scene is incident from the left of FIG. 1 as indicated by rays R. The first two elements, 101 and 102, of the objective lens system form a telephoto construction. The first optical surface 1 of the apparatus (at element 101) is spherical and the second surface 2 is aspheric primarily for the correction of spherical aberration.

Element 102 carries the third and fourth surfaces of the optical train, surfaces 3 and 4, each of which are spherical. Elements 103 to 105 inclusive act together to introduce a large amount of negative distortion, and surface 8 (the rear surface of element 104) is aspheric to assist in achieving this, while surfaces 5 and 6 of element 103, the front surface 7 of element 104, and both surfaces 9 and 10 of element 105 are spherical.

Lens elements 101 to 105 of the objective lens system together form an intermediate image "I" which is distorted negatively and suffers from additional aberrations. Elements 106 and 107 form a two-component relay lens system to relay the intermediate image I onto the detector 110, situated within the dewar 111 and behind the cold shield aperture stop 109.

Lens element 106 of the relay lens system has an aspheric first surface 11, while all other lens surfaces of the relay system are spherical. Lens elements 106 and 107 act in concert with the surfaces 1 to 10 of the lens elements 101 to 105 to correct other off-axis optical aberrations which would otherwise affect the final image "F" formed at the detector surface 17.

As a result of the interaction of all the surfaces upon the incident infra-red radiation, the final image F formed upon the surface of the image detector 110 is substantially well corrected for all aberrations except negative distortion. The lens elements are chosen such that this negative distortion is approximately −50%.

The focal length for axial radiation in this embodiment is 100 mm, while the focal length for radiation incident at the edge of the field of view of the detector 110 is 50 mm (due to the −50% distortion). Thus, there is a 1:2 ratio in angular subtense (in object space) of a central pixel compared to an edge pixel.

The refractive materials of the lens elements of the apparatus have been chosen such that the design is substantially athermal for focus, in other words the focal plane position is substantially constant with temperature (for temperature variations within the working ranges of the apparatus). The principal athermalisation method is to use material referred to in the art as "IG4" for the strongly positive lens elements, but other athermal materials could be used.

The material "IG4" is a proprietary chalcogenide material manufactured by Vitron Spezialwerkstoffe GmbH, Jena, Germany. This is a material having a refractive index which is inherently relatively stable with temperature.

It is to be noted, however, that the invention is not confined to athermal systems and it is to be understood that other materials, not providing an athermal lens design, may be used.

For maximum transmission, it is preferable to use a zinc sulphide material known as "CLEARTRAN" for lens element 102. This material is a proprietary product of Rohm and Haas Incorporated.

A particular example of the optical train in accordance with FIG. 1 has numerical and material data as follows. The refracting surfaces are indicated from front (leftmost in FIG. 1) to back as surfaces 1 to 17, as has been done in the preceding description. Dimensional units are in millimeters (but the values are relative and can be scaled accordingly). A positive radius of curvature indicates a centre of curvature to the right of the lens element, and negative curvature to the left. Surface 17 is the aperture stop (with aperture ratio F/3.5), and the optimum wavelength is 4.5 microns, the spectral range being about 4.0 microns to about 5.0 microns, and the focal length is 100 mm.

Design Data:

| Surface number: | Radius of curvature: | Shape: | Separation after: | Aperture: | Material: |
|---|---|---|---|---|---|
| 1 | 89.605 | spherical | 6.250 | 39.9 | IG4 |
| 2 | −138.61 | aspheric | 13.134 | 39.1 | |
| 3 | −74.259 | spherical | 2.273 | 22.3 | Zinc Sulphide |
| 4 | 74.259 | spherical | 19.820 | 21.3 | |
| 5 | 11.004 | spherical | 5.876 | 20.5 | IG4 |
| 6 | 10.606 | spherical | 4.857 | 15.5 | |
| 7 | 34.439 | spherical | 1.705 | 10.9 | Germanium |
| 8 | 5.574 | aspheric | 2.501 | 9.2 | |
| 9 | −46.974 | spherical | 4.861 | 10.1 | Silicon |
| 10 | −14.460 | spherical | 13.043 | 11.8 | |
| 11 | 18.239 | aspheric | 2.273 | 7.5 | Germanium |
| 12 | 17.244 | spherical | 5.644 | 6.9 | |
| 13 | −63.155 | spherical | 2.273 | 7.8 | Silicon |
| 14 | −15.447 | spherical | 2.901 | 8.0 | |
| 15 | infinity | flat | 1.155 | 4.7 | Silicon |
| 16 | infinity | flat | 0.635 | 4.4 | |
| 17 | infinity | flat | 12.667 | 3.75 | |
| Image | infinity | flat | | 8.6 | |

The curvature of the aspheric surfaces is defined by the equation:

$$Z_{Aspheric} = \frac{cY^2}{1+(1-(1+k)c^2Y^2)^{\frac{1}{2}}} + A_4Y^4 + A_6Y^6 + A_8Y^8 + \ldots$$

where $Z_{Aspheric}$ and 'Y' are distances along mutually orthogonal axes in a plane containing, and with their origin at the point where the surface cuts, the optical axis OA. The quantities c, k, $A_4$, $A_6$, and $A_8$ are parameters having the values given below.

| SURFACE | c | k | A4 | A6 | A8 |
|---|---|---|---|---|---|
| 2 | −0.00721446 | 0.000000 | 1.21110E−06 | −9.82437E−11 | 0. |
| 8 | 0.17940955 | −6.499030 | 6.11132E−04 | 2.03585E−06 | −1.15887E−07 |
| 11 | 0.05482682 | 0.000000 | −3.56689E−04 | 1.35698E−06 | −1.58352E−07 |

A disadvantage of the embodiment illustrated in FIG. 1 is that, in order to provide very high distortion, objective lens elements 103 to 105 require strong optical power. This makes them sensitive to manufacture tolerances to the extent that this lens design may be difficult to manufacture, without undesirable degradation of image quality.

Figure 2:
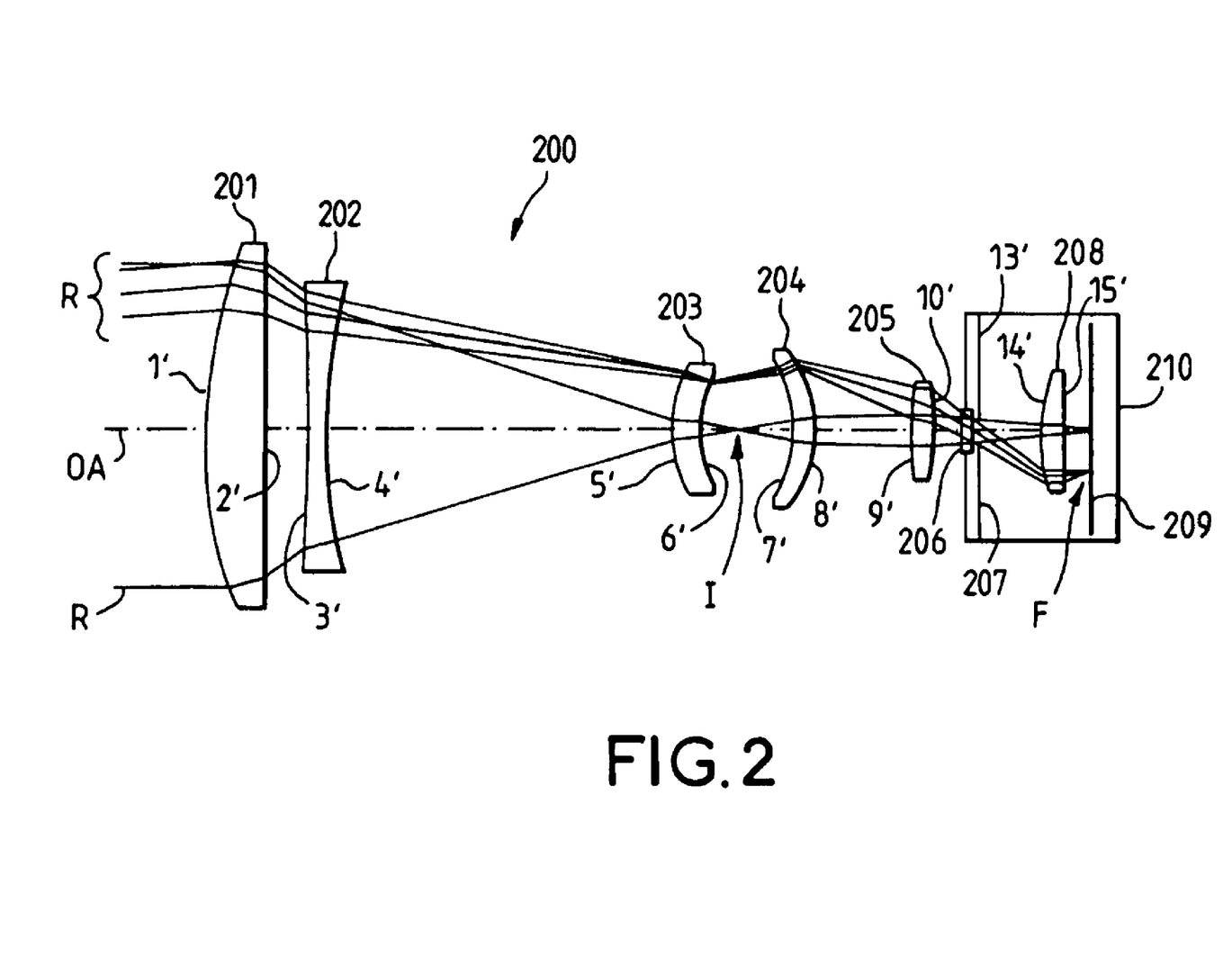
FIG. 2 illustrates an optical apparatus in which one optical lens element of the relay lens system is located after the aperture stop.

A second embodiment of the present invention, as illustrated in FIG. 2, may provide an optical design which is less sensitive to tolerances and may provide an even greater level of distortion.

Referring to FIG. 2, there is shown an optical apparatus 200 having a three element objective lens system having a first lens element 201 with a spherical front surface 1', and a flat rear surface 2'. The second lens element 202 carries a spherical surface 3' and an aspheric surface 4', while the terminal lens element 203 of the objective system carries a spherical surface 5' and an aspheric surface 6'. This objective lens system is arranged to form an intermediate image I after the terminal lens element 203, the intermediate image being substantially negatively ("barrel") distorted principally by the terminal objective lens element.

A three element relay lens system is then provided in the optical train of the apparatus by relay lens elements 204, 205 and 208. The relay lens system begins immediately after the intermediate image plane. Relay lens element 204 carries an aspheric front surface 7' and a spherical rear surface 8', while both the front and rear surfaces, 9' and 10' respectively, of element 205 are spherical. The terminal lens element 208 of the relay lens system carries an aspheric front surface 14' and a flat rear surface 15'. Initial and final relay lens elements 204 and 208 respectively impart substantial negative distortion on the already distorted intermediate image I they relay.

Element 206 is a dewar window which is not a lens element of the relay lens system. The cold shield aperture stop 207 for the apparatus is located a short distance after the dewar window 206. It will be clear therefore that relay lens element 208 is positioned after the aperture stop 207 and directly before the image detector 209 and the final image plane F thereat.

It is to be noted that the dewar window 206 may be placed between lens element 208 and image detector 209 in an alternative embodiment in which the aperture stop 207 is located outside the dewar 210. Similarly, spectral filters may be placed between lens element 208 and image detector 209. Alternatively, the dewar window 206 may be placed between the aperture stop 207 and the final relay lens element 208 in an another embodiment where the aperture stop 207 is located outside the dewar 210 and the detector window and/or spectral filter(s) may be placed between relay lens element 208 and image detector 209.

Terminal relay lens element 208 may be integrated into the detector module (dewar 210) if desired. In this embodiment, refractive materials have been chosen to make the optical system substantially athermal. Objective lens element 202 carries an aspheric surface 4' primarily for the correction of spherical aberration. Objective lens element 203, and relay lens elements 204 and 208 all carry an aspheric surface as identified above, and these three lens elements act together to produce about −60% distortion of the final image F whilst the interaction of all the lens elements (of the optical apparatus) together provides correction or substantial correction of other optical aberrations. The paraxial focal length of the arrangement of FIG. 2 is 100 mm and the focal length for ray bundles at the edge of the field of view is 40 mm, thereby providing a 1:2.5 ratio between angular subtense (in object space) of a central and an edge pixel of the image detector 209.

By incorporating distortion-introducing lens elements close to both the intermediate image I and the final image F, the optical power required of these elements is significantly reduced compared to the arrangement illustrated in FIG. 1 where all distortion-introducing lenses are located in the objective lens system such that only one element (the terminal one) can be close to an image. By separating the distortion-introducing lenses across the objective system and the relay system, the design of the optical apparatus (such as that illustrated in FIG. 2) becomes much less sensitive to manufacture tolerances, and hence easier to produce.

A particular example of the optical train in accordance with FIG. 2 has numerical and material data as follows. The refracting surfaces are indicated from front (leftmost in FIG. 2) to back as surfaces 1' to 16', as has been done in the preceding description of this drawing. Dimensional units are in millimeters (but the values are relative and can be scaled accordingly). A positive radius of curvature indicates a centre of curvature to the right of the lens element, and negative curvature to the left. Surface 13' is the aperture stop (with aperture ratio F/3.5), and the optimum wavelength is 4.5 microns, the spectral range being about 4.0 microns to about 5.0 microns, the semi-field angle is 5.0 degrees, and the focal length is 100 mm.

Design Data:

| Surface number: | Radius of curvature: | Shape: | Separation after: | Aperture: | Material: |
|---|---|---|---|---|---|
| 1' | 39.889 | spherical | 5.454 | 29.8 | IG4 |
| 2' | infinity | flat | 4.253 | 28.6 | |
| 3' | −156.68 | spherical | 1.909 | 23.5 | Zinc Sulphide |
| 4' | 62.019 | aspheric | 31.884 | 22.2 | |
| 5' | 13.985 | spherical | 1.909 | 10.1 | Germanium |
| 6' | 7.064 | aspheric | 8.539 | 8.6 | |
| 7' | −16.094 | aspheric | 2.136 | 11.2 | Germanium |
| 8' | −10.238 | spherical | 8.895 | 12.5 | |
| 9' | 48.635 | spherical | 1.818 | 7.6 | Silicon |
| 10' | −48.635 | spherical | 2.591 | 7.3 | |
| 11' | infinity | flat | 0.923 | 3.2 | Silicon |
| 12' | infinity | Flat | 0.508 | 2.9 | |
| 13' | infinity | Flat | 5.793 | 2.1 | |
| 14' | 36.360 | aspheric | 1.909 | 9.4 | Germanium |
| 15' | infinity | Flat | 2.524 | 9.1 | |
| 16' (Image) | infinity | Flat | | 6.9 | |

The curvature of the aspheric surfaces is defined by the equation:

$$Z_{Aspheric} = \frac{cY^2}{1 + (1 - (1+k)c^2Y^2)^{\frac{1}{2}}} + A_4Y^4 + A_6Y^6 + A_8Y^8 + \ldots$$

where $Z_{Aspheric}$ and 'Y' are distances along mutually orthogonal axes in a plane containing, and with their origin at the point where the surface cuts, the optical axis OA. The quantities c, k, $A_4$, $A_6$, and $A_8$ are parameters having the values given below.

| SURFACE | C | K | A4 | A6 | A8 |
|---|---|---|---|---|---|
| 4' | 0.01612411 | 0.000000 | 2.01673E−06 | 3.08170E−09 | 2.76137E−11 |
| 6' | 0.14156074 | 0.000000 | −8.31031E−04 | −7.42175E−07 | 0.0 |
| 7' | −0.06213566 | 3.455575 | −1.93918E−04 | 1.68672E−06 | 0.0 |
| 14' | 0.02750266 | 0.000000 | 8.52164E−04 | −1.95061E−05 | 1.83245E−07 |

Figure 3:
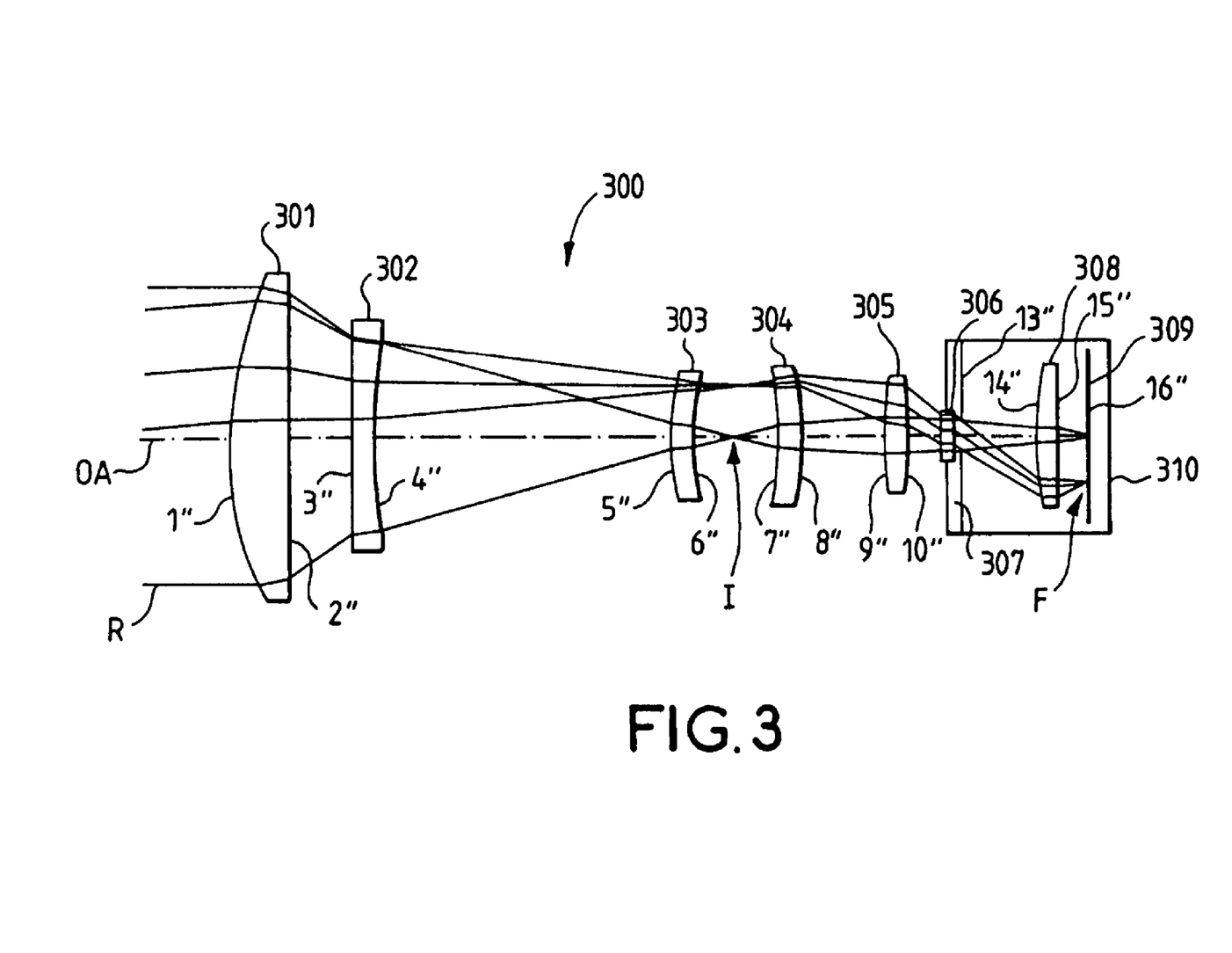
FIG. 3 illustrates an optical apparatus in which one optical lens element of the relay lens system is located after the aperture stop, and a lens of the objective system possesses a diffractive surface.

A modification of this embodiment is shown in FIG. 3.

The optical apparatus 300 shown in FIG. 3 has many similarities with apparatus 200 illustrated in, and described above with reference to, FIG. 2. The modification in the apparatus 300 of FIG. 3 arises through the use of a different approach to athermalisation and colour correction as discussed below.

The front lens element 301 of the objective lens array (comprising elements 301, 302 and 303) carries a provide colour correction and correction of spherical aberration. The successive objective lens element 302 is made of germanium and has strong negative power. Because germanium has a high coefficient of variation of refractive index with temperature, a strongly negative germanium lens element 302 makes a significant contribution to athermalising the system.

Objective lens element 303, and subsequent relay lens elements 304, 305 and 308 perform generally the same function as the corresponding lens elements (203, 204, 205 and 208) illustrated in FIG. 2. Note that element 306 is the Dewar window while the terminal objective lens element 303, the initial relay lens element 304, and the terminal relay lens element 307 all carry aspheric surfaces. The lens elements acting together provide −50% distortion, i.e. a 2:1 ratio between axial and edge-of-field focal length, the paraxial focal length is 100 mm.

Using a diffractive surface to provide colour correction permits the overall length to be reduced compared to the previous embodiment. The off-axis ray bundles R come close to satisfying the telecentric condition at the detector (i.e. the principal rays of the bundles are substantially parallel to the optical axis OA). This assists uniformity of illumination.

A particular example of the optical train in accordance with FIG. 3 has numerical and material data as follows. The refracting surfaces are indicated from front (leftmost in FIG. 3) to back as surfaces 1" to 16", as has been done in the preceding description of this drawing. Dimensional units are in millimeters (but the values are relative and can be scaled accordingly). A positive radius of curvature indicates a centre of curvature to the right of the lens element, and negative curvature to the left. Surface 13" is the aperture stop (with aperture ratio F/3.5), and the optimum wavelength is 4.5 microns, the spectral range being about 4.0 microns to about 5.0 microns, the semi-field angle is 5.0 degrees, and the focal length is 100 mm.

Design Data:

| Surface number: | Radius of curvature: | Shape: | Separation after: | Aperture: | Material: |
|---|---|---|---|---|---|
| 1" | 35.349 | spherical | 5.888 | 29.0 | Zinc Sulphide |
| 2" | −360.09 | aspheric + diffractive | 6.156 | 27.8 | |
| 3" | 303.52 | spherical | 2.386 | 20.2 | Germanium |
| 4" | 71.483 | spherical | 29.238 | 18.5 | |
| 5" | 20.661 | spherical | 2.273 | 10.7 | Germanium |

-continued

| Surface number: | Radius of curvature: | Shape: | Separation after: | Aperture: | Material: |
|---|---|---|---|---|---|
| 6" | 15.393 | aspheric | 8.482 | 9.7 | |
| 7" | −168.65 | aspheric | 2.711 | 10.8 | Germanium |
| 8" | −19.033 | spherical | 7.730 | 11.8 | |
| 9" | 48.757 | spherical | 2.305 | 9.7 | Silicon |
| 10" | −48.757 | spherical | 3.194 | 9.3 | |
| 11" | infinity | flat | 1.154 | 4.1 | Silicon |
| 12" | infinity | flat | 0.635 | 3.7 | |
| 13" | infinity | flat | 7.242 | 2.7 | |
| 14" | 51.653 | aspheric | 2.273 | 12.1 | Germanium |
| 15" | infinity | flat | 3.153 | 11.8 | |
| 16" (Image) | infinity | flat | | 8.7 | |

The curvature of the aspheric surfaces is defined by the equation:

$$Z_{Aspheric} = \frac{cY^2}{1 + (1 - (1+k)c^2Y^2)^{\frac{1}{2}}} + A_4Y^4 + A_6Y^6 + A_8Y^8 + \ldots$$

Where the quantities c, k, $A_4$, $A_6$, and $A_8$ are parameters having the values given below.

| SURFACE | c | k | A4 | A6 | A8 |
|---|---|---|---|---|---|
| 2" | 0.00277705 | 0.000000 | 0.357540E−05 | −0.172862E−08 | 0.0 |
| 6" | 0.06496640 | 0.000000 | −1.63224E−04 | 2.98651E−06 | 0.0 |
| 7" | −0.00592953 | 0.000000 | −3.94246E−04 | 2.13230E−06 | 0.0 |
| 14" | 0.01936000 | 0.000000 | 5.33796E−04 | −9.23470E−06 | 7.00749E−08 |

And diffractive data concerning the diffractive structure of the aspheric and diffractive surface 2" of objective lens element 301 is defined by the equation:

$$Z_{Diff} = \frac{1}{n-1}\left\{[H_2Y^2 + H_4Y^4 + H_6Y^6 + \ldots] + \left(\lambda_0 \times Int\left|\frac{[H_2Y^2 + H_4Y^4 + H_6Y^6 + \ldots]}{\lambda_0}\right|\right)\right\}$$

where n is the refractive index of substrate and $\lambda_0$ is the design wavelength (0.0045 mm). The quantities n and $\lambda_0$ and the quantities $H_2$, $H_4$ and $H_6$ are given below:

| SURFACE | n | $\lambda_0$ | $H_2$ | $H_4$ | $H_6$ |
|---|---|---|---|---|---|
| 2" | 2.24955 | 0.0045 | 0.346495E−03 | 0.0 | 0.0 |

The term $Z_{Diff}$ and 'Y' are distances along mutually orthogonal axes in a plane containing, and with their origin at the point where the surface cuts, the optical axis OA. The term $Z_{Diff}$ is an additional Z value which arises due to the diffractive structure (i.e. additional to the aspheric substrate) such that the surface coordinate Z at an off-axis distance Y on surface 2" is given by $Z_{Aspheric} + Z_{Diff}$.

The three embodiments described above, with reference to FIG. 1, FIG. 2 and FIG. 3, all operate in the 4–5 µm waveband. However, it is to be appreciated that the invention could be applied to optical systems for use in other wavebands, such as the 8–12 µm waveband, provided appropriate refractive materials are used which are transparent in the waveband of interest. Suitable materials for the 8–12 micron waveband include: germanium; silicon; zinc sulphide; zinc selenide or "KRS-5" (thallium bromo-iodide).

Indeed, it is to be understood that modifications and variations may be made to various of the parameters employed in the specific examples provided above, without departing from the spirit and scope of the present invention.

For example, the present embodiments employ a linear optical axis OA, however, the present invention may be applied to an optical system folded at a suitable air gap the optical train (such as between elements 102 and in 103 of the system illustrated in FIG. 1).

The invention claimed is:

1. An optical apparatus comprising:
   an objective lens system for focusing optical radiation from a scene or object into an intermediate image and having at least one lens element which is designed for imposing a substantial predetermined degree of negative distortion for enhancing resolution at the center of the field on the intermediate image;
   a second lens system for focusing optical radiation from the intermediate image into a final image; and
   an aperture stop for limiting the optical radiation forming the final image, the aperture stop being located between the final image region in which the final image is formed or to be formed, and the lens element of the second lens system most distant from the final image region,
   wherein at least one optical element of the second lens system imposes a substantial degree of negative distortion on the final image.

2. An optical apparatus according to claim 1 wherein a lens element of the optical apparatus which is responsible for imparting negative distortion on an image is located next to at least one of the intermediate image region or the final image region in which the respective image is formed or to be formed.

3. An optical apparatus according to claim 2 wherein, the second lens system comprises at least two lens elements for imparting substantial negative distortion on the final image, one lens element of the at least two lens elements located next to the image region of the intermediate image and the other lens element located next to the image region of the final image.

4. An optical apparatus according to claim 3 wherein, the final lens element of the objective lens system imparts a substantial negative distortion on the intermediate image.

5. An optical apparatus according to claim 2 wherein, the second lens system has a lens element for imparting a substantial negative distortion on the final image and being the first lens element following the image region of the intermediate image, and a lens element following the aperture stop of the optical apparatus for imparting a substantial negative distortion on the final image and being the last lens element preceding the final image region.

6. An optical apparatus according to claim 4 wherein, one or more lens elements of the objective lens system which precede the final lens of the objective lens system impart a substantial negative distortion on the intermediate image.

7. An optical apparatus according to claim 1 wherein, the aperture stop is located between the final image region and the final lens element of the second lens system nearest to the final image region.

8. An optical apparatus according to claim 7 wherein, the final lens element of the objective lens system imparts a substantial negative distortion on the intermediate image.

9. An optical apparatus according to claim 8 wherein, one or more lens elements of the objective lens system which precede the final lens thereof impart a substantial negative distortion on the intermediate image.

10. An optical apparatus according to claim 1 further comprising an image detector for detecting the final image, the aperture stop being located between the image detector and the lens element of the second lens system most distant from the image detector.

11. An optical apparatus according to claim 10 wherein, the image detector is an infra-red detector within a dewar and the aperture stop is located next to or within the dewar and serves the function of a cold shield for the image detector.

12. An optical apparatus according to claim 10 wherein the image detector is coupled to an image processing module operable to receive image data from the image detector representing a final image detected thereby.

13. An optical apparatus according to claim 1 wherein, one or more of the lens elements of the optical apparatus which are responsible for imparting substantial negative distortion on either intermediate image or the final image incorporate one or more aspheric surfaces.

14. An optical apparatus according to claim 1 wherein, at least one of the lens elements of both the objective lens system and the relay lens system are chosen to be athermal for focus.

15. An optical apparatus according to claim 1 wherein, one or more of the lens elements of the optical apparatus possess a diffractive structure suitable for providing colour correction in the optics of the optical apparatus.

16. A method of optical imaging comprising:
   focusing optical radiation from a scene or object into an intermediate image with a substantial predetermined degree of negative distortion for enhancing resolution at the center of the field;
   focusing optical radiation from the distorted intermediate image into a negatively distorted final image at a final image region with a lens system;
   limiting the optical radiation forming the final image with an aperture stop located between the final image region and a lens element of said lens system most distant from the final image region,
   wherein a substantial negative distortion is imposed on an image with a lens element being the first lens element following the intermediate image region in which the respective image is formed or to be formed.

17. A method according to claim 16 wherein a substantial negative distortion is imposed on the final image while focusing light from the intermediate image using the lens system.

18. A method according to claim 16 wherein a substantial negative distortion is imposed on an image with a lens element being the last lens element preceding at least one of the intermediate image region or the final image region in which the respective image is formed or to be formed.

19. A method according to claim 16 wherein, substantial negative distortion is imposed on the final image with a lens element of said lens system located next to the image region of the intermediate image and another lens element of said lens system located next to the image region of the final image.

20. A method according to claim 19 wherein, the intermediate image is formed by an objective lens system and substantial negative distortion is imposed on the intermedi ate image using at least a final lens element of the objective lens system.

21. A method according to claim 20 wherein, a substantial negative distortion is imposed on the final image using a lens element of said lens system immediately following the intermediate image region, and a lens element of said lens system following the aperture stop and immediately preceding the final image region.

22. A method according to claim 16 wherein, substantial negative distortion of either or both of the intermediate and final images is provided using lens elements each carrying an aspheric surface.

23. A method according to claim 16 wherein, one or more lens elements have a diffractive structure suitable for providing colour correction.

24. A method according to claim 17 employing an image detector within a dewar wherein said optical radiation from the intermediate image is focused into a final image at an image detection region of said detector; and, the aperture stop is located between the image detection region and the lens element of the lens system most distant from the image detection region.

* * * * *